(12) United States Patent
Ayrapetian et al.

(10) Patent No.: US 9,172,791 B1
(45) Date of Patent: Oct. 27, 2015

(54) NOISE ESTIMATION ALGORITHM FOR NON-STATIONARY ENVIRONMENTS

(71) Applicant: Amazon Technologies, Inc., Reno, NV (US)

(72) Inventors: Robert Ayrapetian, Morgan Hill, CA (US); Arnaud Jean-Louis Charton, Livermore, CA (US); Yuwen Su, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/261,301

(22) Filed: Apr. 24, 2014

(51) Int. Cl.
| | |
|---|---|
| *H04M 3/00* | (2006.01) |
| *H04L 25/03* | (2006.01) |
| *H04B 3/23* | (2006.01) |
| *H04M 9/08* | (2006.01) |

(52) U.S. Cl.
CPC ............ *H04M 3/002* (2013.01); *H04B 3/23* (2013.01); *H04L 2025/03687* (2013.01); *H04M 9/082* (2013.01)

(58) Field of Classification Search
None
See application file for complete search history.

(56) References Cited

U.S. PATENT DOCUMENTS

| | | | |
|---|---|---|---|
| 7,177,416 B1* | 2/2007 | Zhang et al. | 379/387.01 |
| 2008/0152157 A1* | 6/2008 | Lin et al. | 381/71.1 |
| 2009/0190769 A1* | 7/2009 | Wang et al. | 381/66 |
| 2012/0237018 A1* | 9/2012 | Barron et al. | 379/406.08 |

\* cited by examiner

*Primary Examiner* — Fan Tsang
*Assistant Examiner* — Jeffrey Lytle
(74) *Attorney, Agent, or Firm* — Knobbe, Martens, Olson & Bear, LLP (57) ABSTRACT

Features are disclosed for estimating a noise level using a variable step size. An acoustic echo canceller (AEC) may be configured to perform echo cancellation. The acoustic echo canceller may determine an estimated echo using a playback signal. The acoustic echo canceller also may determine an estimated error using the estimated echo and a microphone signal. A variable step size may be determined using the estimated error and the microphone signal. Noise reduction may be performed using the variable step size.

14 Claims, 4 Drawing Sheets

NOISE ESTIMATION ALGORITHM FOR NON-STATIONARY ENVIRONMENTS

BACKGROUND

A device for bi-directional audio-based communication typically may include both a loudspeaker and a microphone. The loudspeaker may be used to play back audio signals received from a remote ("far-end") source, while the microphone may be used to capture audio signals from a local ("near-end") source. In the case of a telephone call, for example, the near- and far-end sources may be people engaged in a conversation, and the audio signals may contain speech. An acoustic echo occurs when the far-end playback signal emitted by the loudspeaker is captured by the microphone, after undergoing reflections in the local environment.

An acoustic echo canceller (AEC) may be used to remove acoustic echo from an audio signal captured by a microphone, in order to facilitate improved communication. The AEC typically filters the microphone signal by determining an estimate of the acoustic echo, and subtracting the estimate from the microphone signal to produce an approximation of the true near-end signal. The estimate is obtained by applying a transformation to the far-end playback signal emitted from the loudspeaker. The transformation may implemented using an adaptive algorithm such as least mean squares, normalized least mean squares, or their variants, which are known to persons of ordinary skill in the art.

The adaptive transformation relies on a feedback loop, which continuously adjusts a set of coefficients that are used to calculate the estimated echo from the playback signal. Different environments produce different acoustic echoes from the same playback signal, and any change in the local environment may change the way that echoes are produced. By using a feedback loop to continuously adjust the coefficients, an AEC can adapt its echo estimates to the local environment in which it operates.

The feedback-based adaptation scheme works better in some situations than in others, so it may be beneficial to increase or decrease the rate of adaptation in different situations. The rate of adaptation may be controlled by adjusting a parameter referred to as "step size." A larger step size will increase the rate of adaptation, and a smaller step size will decrease it.

Many communication devices also include a noise reduction ("NR") module. Noise spectrum estimation is an important component of speech enhancement or recognition systems. If the noise estimate is too low, audible residual noise may cause annoyance, whereas if the noise estimate is too high, distortion of speech may result in intelligibility loss.

Some noise-reduction systems estimate and update the noise spectrum during silent segments of the signal (e.g., pauses) using a voice-activity-detection (VAD) algorithm. Such systems may be used in environments with stationary noise that is unchanging (e.g., white noise). However, such systems have trouble performing noise reduction in more realistic environments with noise that may be constantly changing. Such systems that rely on VAD algorithms are unable to estimate and update the noise spectrum during non-silent segments of the signal during which noise in an environment may be changing.

Other noise-reduction systems estimate and update the noise spectrum using noisy signal statistics. However, such systems fail to take into account information gained from acoustic echo cancellation.

Although these problems have been framed in reference to an audio-based communication system, the same problems may be encountered in any field in which echo cancellation and noise estimation is performed. The disclosure described herein is equally applicable to any such fields.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to performing noise reduction using information of a variable step size. An acoustic echo canceller (AEC) may be configured to perform echo cancellation. For example, the acoustic echo canceller may determine an estimated echo using a playback signal. The acoustic echo canceller also may determine an estimated error using the estimated echo and a microphone signal. A variable step size may be determined using the estimated error and the microphone signal. Noise reduction may be performed using the variable step size. For example, a smaller step size may indicate a double talk condition that may be disruptive to noise estimation. When the step size is relatively small, noise may be estimated using the step size so that noise estimation is not unduly influenced by double talk. In contrast, a larger step size may indicate an absence of a double talk condition. When the step size is relatively large, noise may be estimated without concern of undue influence of double talk. Further explanation is provided below, with reference to accompanying figures.

Figure 1:
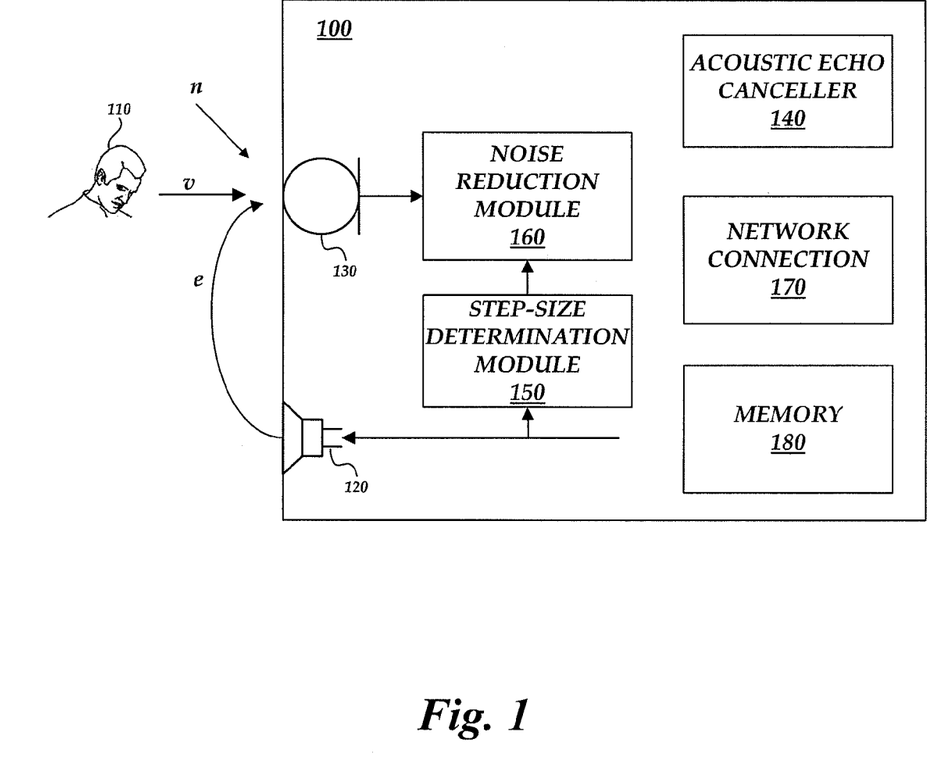
FIG. 1 is a block diagram illustrating components of some communication systems that perform noise reduction using information from a step-size determination module.

FIG. 1 shows an example of a communication system 100. Communication system 100 may be implemented in hardware and/or software using techniques known to persons of skill in the art. For example, communication system 100 may be implemented by a single telecommunication device, such as a mobile phone, or by a combination of several devices such as a mobile computing device and a network-accessible server.

FIG. 1 shows components that may appear in communication system 100, including a loudspeaker 120, a microphone 130, an acoustic echo canceller 140, a step-size determination module 150, a noise reduction module 160, a network connection 170, and a memory 180. In some embodiments, the step-size determination module may be incorporated as a module within the acoustic echo canceller 140. Sound produced by the loudspeaker 120 may create an acoustic echo e. Also, speech produced by a user 110 may create a speech signal v. In addition, a noise signal n may be present in the local non-stationary environment.

Network connection 170 may be used to send and receive communication signals over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

The memory 180 can include any memory for storing data, including RAM memory, flash memory, ROM memory, EPROM memory, EEPROM memory, registers, hard disk, a removable disk, a CD-ROM, or any other form of a non-transitory computer-readable storage medium. The memory 180 can be in communication with any of the loudspeaker 120, microphone 130, acoustic echo canceller 140, step-size determination module 150, noise reduction module 160, and network connection 170. In addition, in some embodiments, the steps of a method, process, routine, or algorithm described in connection with the embodiments disclosed herein can be embodied directly in hardware, in a software module executed by a processor, or in a combination of the two. The software module can reside in memory 180.

The communication signals that are sent and received by network connection 170 may include a far-end playback signal, which may be emitted from loudspeaker 120, and an AEC playback signal, produced by acoustic echo canceller 140. The AEC playback signal may be determined by adaptively filtering a signal from microphone 130. For the sake of simplicity, microphone 130 is sometimes referred to herein as a single component. However, in some embodiments, multiple microphones may be used together and an acoustic echo canceller may be provided for each one. The step-size determination module 150 may determine step sizes on a continuous basis to control the rate of adaptation in acoustic echo canceller 140. In some embodiments, the step-size determination module 150 may be implemented as a separate module. In other embodiments, the step-size determination module 150 may be implemented as a module within the acoustic echo canceller 140. Additional aspects of the communication system 100 are described below, with respect to FIGS. 2-5.

Figure 2:
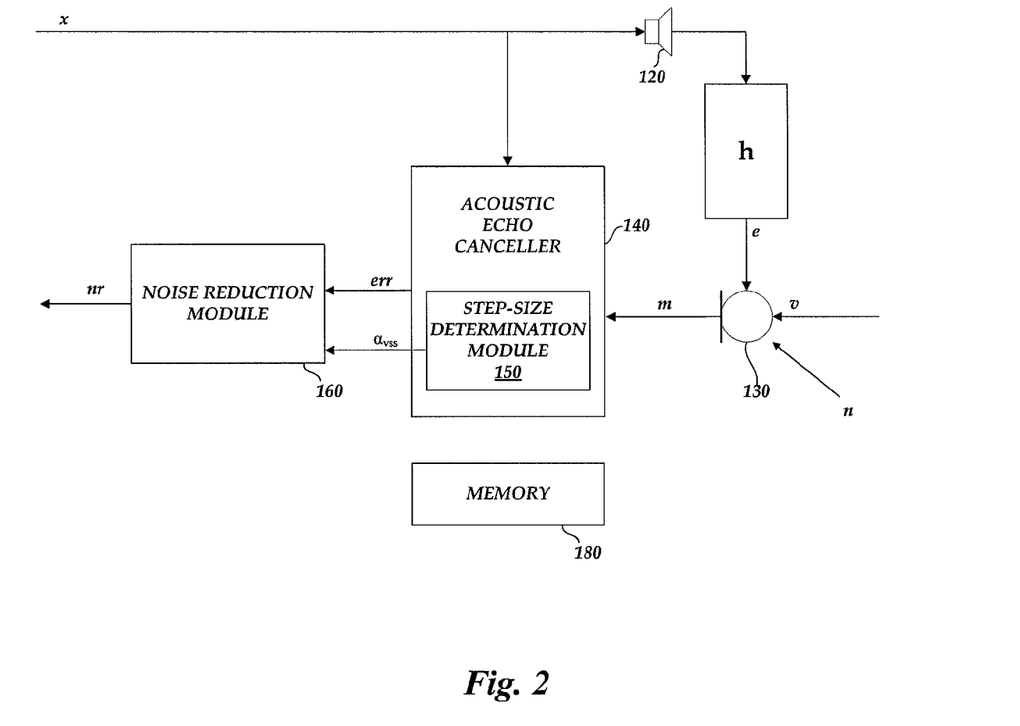
FIG. 2 is a signal diagram depicting the relationships between various signals that are used to perform acoustic echo cancellation and noise reduction in accordance with the present disclosure.

FIG. 2 is a signal diagram that illustrates the relationships between various signals that are used to perform acoustic echo cancellation and noise reduction in accordance with the present disclosure. Certain components of FIG. 2 correspond to components from FIG. 1, and retain the same numbering. These components include loudspeaker 120, microphone 130, acoustic echo canceller 140, step-size determination module 150, noise reduction module 160, and memory 180. The signals depicted in FIG. 2 include playback signal x, acoustic echo e, voice signal v, noise signal n, microphone signal m, AEC output err, and noise reduction module output nr. FIG. 2 also depicts acoustic transfer function h. In some embodiments, the communication system may be a computing device that includes one or more processors and a memory 180 which may contain software applications executed by the processors. For example, each of the acoustic echo canceller 140, step-size determination module 150, and noise reduction module 160 may be implemented by one or more processors running software applications executed by the processors.

In the example of FIG. 2, acoustic echo may occur as follows. Playback signal x is emitted from loudspeaker 120 and undergoes various reflections in the local environment according to acoustic transfer function h, yielding acoustic echo e. Microphone 130 captures acoustic echo e, voice signal v, and noise signal n, which together produce microphone signal m. For example, the microphone signal m may comprise the sum of the acoustic echo e, the voice signal v, and the noise signal n. The presence of acoustic echo m and noise signal n in microphone signal m may interfere with the recognition of near-end signal v by a listener, thereby hindering communication. Accordingly, it may be desirable to filter microphone signal m in order to remove acoustic echo e, to the extent that such removal is possible. In addition, it may be desirable to perform noise reduction on microphone signal m, either before or after acoustic echo cancellation has been performed, in order to remove noise signal n to the extent that such removal is possible.

In some embodiments, AEC 140 may be configured to filter microphone signal m in the following manner. Samples of a received microphone signal m may be collected in an input buffer. The microphone signal m may be converted to a frequency domain signal M using a fast-Fourier transform operation (e.g., a short-term FFT) as follows:

$$M(\lambda,k)=\Sigma_{n=0}^{L-1} m(\lambda*R+n)*w(n)*e^{-j\pi nk/L}$$

In this equation, L is the number of samples in a frame, λ is a frame index, n is a sample number, j is the square root of −1, and k is a frequency-bin index, which may take values from 0 to L−1. For example, during a period of time, L samples of microphone signal m may be received and collected in an input buffer corresponding to frame λ. Values of the frequency-domain signal M may be computed for the frame λ. Another frequency-domain signal M may be calculated by shifting R samples in the input buffer. In some embodiments, L may be 256 samples, and R may be L/2 samples (e.g., 128 samples). In addition, w(n) can be a hamming window or a hann window. In particular, w(n) may have a value of 1 for values of n within the window and a value of 0 for values of n outside the window.

In some embodiments, AEC 140 may be configured to filter microphone signal m in the following manner. First, AEC 140 applies an estimated transfer function $h_{est}$ to playback signal x, yielding estimated echo $h_{est}*x$. Estimated echo $h_{est}*x$ is subtracted from microphone signal m, producing AEC output err. AEC output err is an estimate of the near-end signal voice signal v and background noise n. For example, err may be calculated as:

$$err=m-h_{est}*x$$

As described above, AEC 140 relies on an estimated transfer function $h_{est}$. The estimation of transfer function $h_{est}$ may be adaptive. For example, the coefficients of the transfer function may be adjusted automatically and continuously by a feedback loop. AEC 140 may determine adjustments to the rate of adaptation used in the feedback loop, and may also directly adjust the values of the coefficients used in transfer function $h_{est}$ under certain circumstances.

In some embodiments, the step-size determination module 150, which may be implemented as a module of the AEC 140, may determine a variable step size $\alpha_{vss}$ using the playback signal x, the microphone signal m, and the error signal err. In general, the variable step size $\alpha_{vss}$ comprises values between 0 and 1. If speech is present (e.g., a doubletalk condition), $\alpha_{vss}$ tends to approach 0. If speech is absent, $\alpha_{vss}$ tends to approach 1.

In some embodiments, the step-size determination module 150 may determine $\alpha_{vss}$ in the time domain as follows. In particular, a time domain normalized LMS adaptive filter algorithm may be used to update adaptive filter weights h. In particular, adaptive filter taps $h=[h_0, h_1, \ldots, h_{L-1}]$ may be updated based on the equation:

$$h(\lambda,n)=h((\lambda-1,n)+\mu*x(n)*\text{err}(n)/\|x\|^2,$$

In this equation, $\lambda$ is a current frame index, n is a sample index, x is a playback or reference signal, err is an AEC output, and $\|x\|^2$ is a power of the signal x. The step size $\mu$ generally may comprise a constant value between 0 and 2.

In some embodiments, the variable step size $\alpha_{vss}$ may be determined for each sample index n, whereas in other embodiments, the variable step size $\alpha_{vss}$ may be determined one per frame index $\lambda$. If the variable step size $\alpha_{vss}$ is determined for each sample index n, a per sample smoothed power estimation may be determined. For example, the variance $\sigma_m^2$ of the microphone signal m for a given frame $\lambda$ and for each sample index n may be determined as follows:

$$\sigma_m^2(\lambda,n)=\beta_m*\sigma_m^2(\lambda-1,n)+(1-\beta_m)*m(n)^2$$

The variance $\sigma_x^2$ of the playback signal x for a given frame $\lambda$ and for each sample index n may be determined as follows:

$$\sigma_x^2(\lambda,n)=\beta_x*\sigma_x^2(\lambda-1,n)+(1-\beta_x)*x(n)^2$$

The variance $\sigma_{err}^2$ of the AEC output err for a given frame $\lambda$ and for each sample index n may be determined as follows:

$$\sigma_{err}^2(\lambda,n)=\beta_e*\sigma_{err}^2(\lambda-1,n)+(1-\beta_e)*\text{err}(n)^2$$

In the above equations, $\beta_m$, $\beta_x$, and $\beta_e$ are smoothing constants for the microphone signal m, playback signal x, and AEC output err, respectively. Each of $\beta_m$, $\beta_x$, and $\beta_e$ usually have values chosen between approximately 0.7 and 0.9995.

In addition, a smoothed cross correlation $R_{merr}$ between microphone signal m and AEC output err may be defined using previous values of $R_{merr}$ as:

$$R_{merr}(\lambda,n)=\beta_{me}*R_{merr}(\lambda-1,n)+(1-\beta_{me})*m(n)*\text{err}(n)$$

In some embodiments, if the variable step size $\alpha_{vss}$ is determined for each frame $\lambda$, a per frame smoothed power estimation may be determined. For example, the variance $\sigma_m^2$ of the microphone signal m for a given frame $\lambda$ may be determined as follows:

$$\sigma_m^2(\lambda)=\beta_m*\sigma_m^2(\lambda-1)+(1-\beta_m)*P_m(\lambda)^2$$

The variance $\sigma_x^2$ of the playback signal x for a given frame may be determined as follows:

$$\sigma_x^2(\lambda)=\beta_x*\sigma_x^2(\lambda-1)+(1-\beta_x)*P_x(\lambda)^2$$

The variance $\sigma_{err}^2$ of the AEC output err for a given frame $\lambda$ may be determined as follows:

$$\sigma_{err}^2(\lambda)=\beta_e*\sigma_{err}^2(\lambda-1)+(1-\beta_e)*P_{err}(\lambda)^2$$

In the above equations, $P_m(\lambda)$, $P_x(\lambda)$, and $P_{err}(\lambda)$ may be determined using the following equation:

$$P_z(\lambda)=(1/L)*\sum_{n=0}^{L-1}z(n)^2$$

In addition, a per-frame smoothed cross correlation between microphone signal m and AEC output err may be defined as:

$$R_{merr}(\lambda,n)=\beta_{me}*R_{merr}(\lambda-1,n)+(1-\beta_{me})*m(n)*\text{err}(n)$$

In addition, the per-frame smoothed cross correlation may be determined as:

$$R_{merr}(\lambda)=R_{merr}(\lambda,L-1)$$

In some embodiments, the step-size determination module 150 may determine $\alpha_{vss}$ in the time domain using an average power of the audio playback signal x, an average power of the microphone signal m, and an average power of the estimated error err. For example, the step-size determination module 150 may determine $\alpha_{vss}$ using the following equation:

$$\alpha_{vss}(\lambda,n)=(\sigma_x^2(\lambda,n)+\eta*\sigma_m^2(\lambda,n))/(\sigma_x^2(\lambda,n)+\eta*\sigma_m^2(\lambda,n)+\kappa*\sigma_{err}^2(\lambda,n))$$

In this equation, $\sigma_x^2(\lambda,n)$, $\sigma_m^2(\lambda,n)$, and $\sigma_{err}^2(\lambda,n)$ may be calculated as described above, whereas $\eta$ and $\kappa$ are determined numbers. For example, $\eta$ may be selected as a constant greater than or equal to zero, and $\kappa$ may be a positive number. In some embodiments, $\kappa$ is chosen to be a positive number greater than or equal to 100. If $\eta$ is selected to be zero, $\alpha_{vss}$ may be determined as:

$$\alpha_{vss}(\lambda,n)=\sigma_x^2(\lambda,n)/(\sigma_x^2(\lambda,n)+\kappa*\sigma_{err}^2(\lambda,n))$$

As shown in the above equations, determining the variable step size $\alpha_{vss}$ may comprise determining a numerator using the average power of the audio playback signal $\sigma_x^2$ and the average power of the microphone signal $\sigma_m^2$. In addition, determining the variable step size $\alpha_{vss}$ may comprise determining a denominator using the average power of the audio playback signal $\sigma_x^2$, the average power of the microphone signal $\sigma_m^2$, and the average power of the estimated error $\sigma_{err}^2$. Also, determining the variable step size $\alpha_{vss}$ may comprise dividing the numerator by the denominator to determine the variable step size.

In some embodiments, the step-size determination module 150 may determine $\alpha_{vss}$ using a cross correlation between the microphone signal m and the estimated error err. For example, the step-size determination module 150 may determine $\alpha_{vss}$ using a cross correlation between the microphone signal m and the estimated error err according to the following equation:

$$\alpha_{vss}(\lambda,n)=1-R_{merr}^2(\lambda,n)/(\sigma_m^2(\lambda,n)*\sigma_{err}^2(\lambda,n))$$

In some embodiments, the step-size determination module 150 may determine $\alpha_{vss}$ in the frequency domain as follows. In particular, a frequency domain adaptive filter (FDAF) algorithm may be used to update adaptive filter taps $W(\lambda,k)$ based on the equation:

$$W(\lambda,k)=W((\lambda-1,k)+\mu*X(\lambda,k)*\text{ERR}(\lambda,k)/\|X(\lambda,k)\|^2$$

In this equation, $\lambda$ is a current frame index, k is the frequency bin index, $X(\lambda,k)$ is an FFT of the playback signal x, ERR is an FFT of the AEC output err, and $\|X(\lambda,k)\|^2$ is an average power of the frequency-domain playback signal $X(\lambda,k)$. The step size $\mu$ generally may comprise a constant value between 0 and 2.

In some embodiments, the variable step size $\alpha_{vss}$ may be determined for each frame index $\lambda$ and frequency bin index k. For example, the variance $\sigma_M^2$ of the microphone signal M for a given frame $\lambda$ and frequency bin index k may be determined as follows:

$$\sigma_M^2(\lambda,k)=\beta_m*\sigma_M^2(\lambda-1,k)+(1-\beta_m)*|M(\lambda,k)|^2$$

In this equation, $M(\lambda,k)$ is an FFT of the microphone signal is an FFT of the microphone signal m, and $|M(\lambda,k)|^2$ is an average power of the frequency-domain microphone signal $M(\lambda,k)$. In addition, the variance $\sigma_X^2$ of the playback signal X for a given frame $\lambda$ and frequency bin index k may be determined as follows:

$$\sigma_X^2(\lambda,k)=\beta_x*\sigma_X^2(\lambda-1,k)+(1-\beta_x)*|X(\lambda,k)|^2$$

In addition, the variance $\sigma_{ERR}^2$ of the AEC output ERR for a given frame $\lambda$ and frequency bin index k may be determined as follows:

$$\sigma_{ERR}^2(\lambda,k)=\beta_e*\sigma_{ERR}^2(\lambda-1,k)+(1-\beta_e)*|ERR(k)|^2$$

In addition, the frequency-domain smoothed cross correlation between microphone signal M and AEC output ERR may be determined as:

$$R_{MERR}(\lambda,k)=\beta_{me}*R_{MERR}(\lambda-1,k)+(1-\beta_{me})*M(k)*ERR(k)$$

In the above equations, $\beta_m$, $\beta_x$, and $\beta_e$ are smoothing constants for the microphone signal M, playback signal X, and AEC output ERR, respectively. Each of $\beta_m$, $\beta_x$, and $\beta_e$ usually have values chosen between approximately 0.7 and 0.9995.

In some embodiments, the step-size determination module 150 may determine $\alpha_{vss}$ in the frequency domain using an average power of the audio playback signal X, an average power of the microphone signal M, and an average power of the estimated error ERR. For example, the step-size determination module 150 may determine $\alpha_{vss}$ using the following equation:

$$\alpha_{vss}(\lambda,k)=(\sigma_X^2(\lambda,k)+\eta*\sigma_M^2(\lambda,k))/(\sigma_X^2(\lambda,k)+\eta*\sigma_M^2(\lambda,k)+\kappa*\sigma_{ERR}^2(\lambda,k))$$

In this equation, $\sigma_X^2(\lambda,k)$, $\sigma_M^2(\lambda,k)$, and $\sigma_{ERR}^2(\lambda,k)$ may be calculated as described above, whereas $\eta$ and $\kappa$ are determined numbers. For example, $\eta$ may be selected as a constant greater than or equal to zero, and $\kappa$ may be a positive number. In some embodiments, $\kappa$ is chosen to be a positive number greater than or equal to 100. If $\eta$ is selected to be zero, $\alpha_{vss}$ may be determined as:

$$\alpha_{vss}(\lambda,k)=\sigma_X^2(\lambda,k)/(\sigma_X^2(\lambda,k)+\kappa*\sigma_{ERR}^2(\lambda,k))$$

As shown in the above equations, determining the variable step size $\alpha_{vss}(\lambda,k)$ may comprise determining a numerator using the average power of the audio playback signal $\sigma_X^2(\lambda,k)$ and the average power of the microphone signal $\sigma_M^2(\lambda,k)$. In addition, determining the variable step size $\alpha_{vss}(\lambda,k)$ may comprise determining a denominator using the average power of the audio playback signal $\sigma_X^2(\lambda,k)$, the average power of the microphone signal $\sigma_M^2(\lambda,k)$, and the average power of the estimated error $\sigma_{ERR}^2(\lambda,k)$. Also, determining the variable step size $\alpha_{vss}(\lambda,k)$ may comprise dividing the numerator by the denominator to determine the variable step size.

In some embodiments, the step-size determination module 150 may determine $\alpha_{vss}(\lambda,k)$ using a cross correlation between the microphone signal M and the estimated error ERR. For example, the step-size determination module 150 may determine $\alpha_{vss}(\lambda,k)$ using a cross correlation between the microphone signal M and the estimated error ERR according to the following equation:

$$\alpha_{vss}(\lambda,k)=1-R_{MERR}^2(\lambda,k)/(\sigma_M^2(\lambda,k)*\sigma_{ERR}^2(\lambda,k))$$

Regardless of whether the step-size determination module 150 determines the variable step size $\alpha_{vss}$ in the time domain using the average powers $\sigma_x^2(\lambda,n)$, $\sigma_m^2(\lambda,n)$, and $\sigma_{err}^2(\lambda,n)$ of the playback signal x, the microphone signal m, and the estimated error err, respectively, or using a cross correlation between the microphone signal m and the estimated error err, or whether the step-size determination module 150 determines the variable step size $\alpha_{vss}(\lambda,k)$ in the frequency domain using the average powers $\sigma_X^2(\lambda,k)$, $\sigma_M^2(\lambda,k)$, and $\sigma_{ERR}^2(\lambda,k)$ of the frequency-domain representations of the playback signal X, the microphone signal M, and the estimated error ERR, respectively, or using a cross correlation between the microphone signal M and the estimated error ERR, the variable step size $\alpha_{vss}$ generally matches certain properties. For example, $\alpha_{vss}$ is generally in the range of $0 \leq \alpha_{vss} \leq 1$. In addition, if speech is present (e.g., a doubletalk condition), the estimated error err will be relatively large, and therefore $\alpha_{vss}$ will tend to approach zero. If speech is not present, the estimated error err will be relatively small, and therefore $\alpha_{vss}$ will tend to approach one.

As shown in FIG. 2, the noise reduction module 160 may receive as its input the AEC output err. In addition, the noise reduction module 160 may receive as input the variable step size $\alpha_{vss}$, which may be received from the step-size determination module 150 or from the AEC 140. In some embodiments, the noise reduction module 160 may estimate a noise level of the microphone signal using the variable step size $\alpha_{vss}$, as further explained below. In addition, the noise reduction module 160 may perform noise reduction on the microphone signal using the estimate of the noise level.

In various embodiments, any noise reduction algorithm may be modified using the variable step size $\alpha_{vss}$ to improve noise estimation during doubletalk conditions and when a noise profile is non-stationary. The particular noise reduction algorithms described below are for illustrative purpose only.

In some embodiments, the noise reduction module 160 performs noise estimation using a minimum tracking algorithm. For example, the AEC output err(n) may comprise a noisy speech signal, and $ERR(\lambda,k)$ may denote the STFT of err(n) at a given frame index $\lambda$ and frequency-bin index k. A noise estimate of $ERR(\lambda,k)$ may be determined using a first-order recursive equation:

$$P(\lambda,k)=\tau(\lambda,k)*P(\lambda-1,k)+(1-\tau(\lambda,k))*|ERR(\lambda,k)|^2$$

In this equation, $\tau(\lambda,k)$ may be determined as follows:

$$\tau(\lambda,k)=1-(1-\alpha)*\alpha_{vss}(\lambda,k)$$

In this equation, $\alpha$ may be a smoothing constant in a range of 0.7 to 0.9. The variable step size $\alpha_{vss}(\lambda,k)$ is the variable step size parameter as described above. In addition, $\alpha_{vss}(\lambda,k)$ may be computed in the time domain once per frame using:

$$\alpha_{vss}(\lambda)=(\sigma_x^2(\lambda)+\eta*\sigma_m^2(\lambda))/(\sigma_x^2(\lambda)+\eta*\sigma_m^2(\lambda)+\kappa*\sigma_{err}^2(\lambda))$$

Alternatively, $\alpha_{vss}(\lambda,k)$ may be calculated using:

$$\alpha_{vss}(\lambda,k)=(\sigma_X^2(\lambda,k)+\eta*\sigma_M^2(\lambda,k))/(\sigma_X^2(\lambda,k)+\eta*\sigma_M^2(\lambda,k)+\kappa*\sigma_{ERR}^2(\lambda,k))$$

If speech is present (e.g., a doubletalk condition), the AEC output error err will be relatively large, and the variable step size $\alpha_{vss}(\lambda,k)$ will tend to approach zero. Accordingly, under these conditions, $\tau(\lambda,k)$ will tend to approach 1, which means that $1-\tau(\lambda,k)$ will tend to approach 0, and $|ERR(\lambda,k)|^2$ will tend to not be added in determining the noise estimate. In particular, under these conditions, the noise estimate will remain the same as the previous noise estimate:

$$P(\lambda,k)\approx P(\lambda-1,k)$$

In contrast, if speech is absent, the AEC output error err will be relatively small, and the variable step size $\alpha_{vss}(\lambda,k)$ will tend to approach one. Accordingly, under these conditions, $\tau(\lambda,k)$ will tend to approach $\alpha$, which means that $1-\tau(\lambda,k)$ will tend to approach $1-\alpha$, and the noise estimate $P(\lambda,k)$ will approximate $|ERR(\lambda,k)|^2$. In particular, the noise estimate will follow the psd of the noise spectrum in the absence of speech.

In some embodiments, estimating the noise level of the AEC output error err may comprise determining a plurality of values of a power spectrum of the echo-reduced signal; determining a minimum value of the plurality of values of the power spectrum of the echo-reduced signal; and determining the estimate of the noise level using the minimum value of the power spectrum. For example, a minimum power may be determined based on D previous power estimates as follows:

$$P_{min}(\lambda,k)=\min\{P(\lambda,k),P(\lambda-1,k),\ldots,P(\lambda-D+1,k)\}$$

In some embodiments, the noise estimate at frame λ may be determined as $$\sigma_{ERR}^2(\lambda,k)=B_{min}((\lambda,k)*P_{min}(\lambda,k)$$

In this equation, $B_{min}((\lambda,k)$ is a bias factor, which may be independent of the noise power spectrum. The value of $B_{min}((\lambda,k)$ may depend on the values D, α and parameters L, R, and w.

In other embodiments, a noise estimate may be determined as follows. First, the noise estimate $P_{min}(\lambda,k)$ may be initialized for a first frame, λ=0:

$$P_{min}(0,k)=P(0,k).$$

Then, for subsequent frames λ>0, if the noise estimate at a particular frequency bin is less than any previous noise estimate at the particular frequency bin (e,g, if $P_{min}(\lambda-1,k)<P(\lambda,k)$), then the noise estimate may be updated as follows:

$$P_{min}(\lambda,k)=\Upsilon*P_{min}(\lambda-1,k)+(1-\Upsilon)/(1-\beta)*(P(\lambda,k)-\beta*P(\lambda-1,k))$$

If the noise estimate at a particular frequency bin is not less than any previous noise estimate at the particular frequency bin, then $P_{min}(\lambda,k)$ may be set equal to $P(\lambda,k)$.

In other embodiments, noise reduction module 160 may determine a noise estimate using a time-varying recursive algorithm as follows. First, the smoothed power spectrum of ERR(λ,k) may be calculated as described above:

$$P(\lambda,k)=\tau(\lambda,k)*P(\lambda-1,k)+(1-\tau(\lambda,k))*|ERR(\lambda,k)|^2$$

As above, τ(λ,k) may be determined as follows:

$$\tau(\lambda,k)=1-(1-\alpha(\lambda,k))*\alpha_{vss}(\lambda,k)$$

The variable step size parameter $\alpha_{vss}(\lambda,k)$ may be computed as described above. The parameter α(λ,k) may be determined as follows:

$$\Upsilon_k(\lambda)=|M(\lambda,k)|/DEN(\lambda,k),$$

$$DEN(\lambda,k)=0.1*\Sigma_{m=1}^{10}P(\lambda-m,k)$$

$$\alpha(\lambda,k)=1-\min\{1,1/\Upsilon_k(\lambda)\}$$

If speech is present the AEC output error err may be relatively large, and $\Upsilon_k(\lambda)$ may be relatively large. Therefore, under doubletalk conditions, α(λ,k) will be approximately 1 and $\alpha_{vss}(\lambda,k)$ will be approximately 0. Hence, τ≈1 and 1−τ≈0; and noisy signal $|ERR(\lambda,k)|^2$ will not be added and noise estimate will remain the same as the previous frame's estimate:

$$P(\lambda,k)\approx P(\lambda-1,k)$$

On the other hand, if speech is absent, the AEC output error err may be relatively small, and $\Upsilon_k(\lambda)$ may be relatively small. Hence, $\alpha_{vss}(\lambda,k)$ may be approximately 1 and α(λ,k) may be approximately 0. Accordingly, in the absence of speech, τ is approximately 0, 1−τ is approximately 1, and P(λ,k) is approximately $|ERR(\lambda,k)|^2$. For example, the noise estimate may follow the psd of the noisy spectrum in the absence of the speech.

In addition, noise reduction module 160 may determine a noise estimate using another time-varying recursive algorithm as follows. If α is a fixed smoothing parameter between 0 and 1 and if $\alpha_{vss}(\lambda,k)$ is a variable step size parameter as described above, b(i) may be a normalized window function of length 2*M+1 determined as:

$$\sum_{i=-M}^{M} b(i) = 1.$$

Frequency smoothing of the noisy power spectrum in each frame λ may be defined by:

$$S_f(\lambda,k)=\Sigma_{i=-M}^{M}b(i)*\alpha vss(\lambda,k-i)*|ERR(\lambda,k-i)|^2$$

Subsequently, smoothing in time may be performed by a first-order recursive averaging, as follows:

$$P(\lambda,k)=\tau(\lambda,k)*P(\lambda-1,k)+(1-\tau(\lambda,k))*S_f(\lambda,k)$$

In this equation, τ(λ,k) may be determined as follows:

$$\tau(\lambda,k)=1-(1-\alpha)*\alpha_{vss}(\lambda,k).$$

If speech is present, the AEC output error err may be relatively large, and therefore $\alpha_{vss}(\lambda,k)$ may be approximately 0. Hence, $S_f(\lambda,k)$ may be relatively small, τ may be approximately 1 and 1−τ may be approximately 0. In addition, noisy signal $|ERR(\lambda,k)|^2$ will not be added, or only a small portion thereof, and noise estimate will remain approximately the same as the previous frame's estimate:

$$P(\lambda,k)\approx P(\lambda-1,k)$$

If speech is absent, the AEC output error err may be relatively small and therefore $\alpha_{vss}(\lambda,k)$ may be approximately 1. Then, τ may be approximately α, 1−τ may be approximately 1−α, and P(λ,k) will be approximately $|ERR(\lambda,k)|^2$. In particular, the noise estimate likely will follow the psd of the noisy spectrum in the absence of the speech.

In addition, noise reduction module 160 may determine a noise estimate using another time-varying recursive algorithm as follows. If α is a fixed smoothing parameter between 0 and 1 and if $\alpha_{vss}(\lambda,k)$ is a variable step size parameter as described above, smoothing in time may be performed by a first-order recursive averaging as follows:

$$S(\lambda,k)=\tau(\lambda,k)*S(\lambda-1,k)+(1-\tau(\lambda,k))*|ERR(\lambda,k)|^2$$

In this equation, τ(λ,k) may be determined as follows:

$$\tau(\lambda,k)=1-(1-\alpha)*\alpha_{vss}(\lambda,k).$$

In addition, further enhancement may be achieved if the error ERR(λ,k) are weighted according to the expected power spectrum density S(λ,k) of the background noise:

$$P(\lambda,k)=\tau(\lambda,k)*P(\lambda-1,k)+(1-\tau(\lambda,k))*S_f(\lambda,k)$$

In this equation, $S_f(\lambda,k)$ may be determined as follows:

$$S_f(\lambda,k)=\Sigma_{i=-M}^{M}q(i)*\alpha vss(\lambda,k-i)*|ERR(\lambda,k-i)|^2$$

In this equation, q(i) may be determined as follows:

$$q(i)=\xi_i/D, D=\xi_M+\ldots+\xi_M; \xi_i=1/P(\lambda,k-i).$$

In addition, q(M) may satisfy the following equation:

$$q(-M)+\ldots+q(M)=1.$$

If speech is present the AEC output error err may be relatively large, and therefore the noisy signal $|ERR(\lambda,k)|^2$ will not be added, or only a relatively small portion thereof, and the noise estimate will remain approximately the same as the previous frame's estimate:

$$P(\lambda,k)\approx P(\lambda-1,k)$$

If speech is absent, the AEC output error err may be relatively small, and therefore $\alpha_{vss}(\lambda,k)$ may be approximately 1, and $P(\lambda,k)$ may be approximately $|ERR(\lambda,k)|^2$. For example, the noise estimate may follow the psd of the noisy spectrum in the absence of the speech.

In some embodiments, the noise reduction module 160 may determine signal-to-noise ratio (SNR) using the estimated error err and the estimate of the noise level. For example, a smoothed power spectrum $P_{signal}((\lambda,k)$ of $ERR(\lambda,k)$ may be determined as follows:

$$P_{signal}(\lambda,k)=\alpha*P_{signal}(\lambda-1,k)+(1-\alpha)*|ERR(\lambda,k)|^2$$

$ERR(\lambda,k)$ generally comprises the sum of the frequency-domain speech signal v and noise signal n (e.g., $ERR(\lambda,k)=Speech(\lambda,k)+Noise(\lambda,k)$). The speech signal and noise signal are not correlated, so the smoothed power spectrum $P_{signal}((\lambda,k)$ may be determined as:

$$P_{signal}(\lambda,k)=P_{speech}(\lambda,k)+P_{noise}(\lambda,k)$$

The $SNR(\lambda,k)$ for each frequency bin index may be defined as:

$$SNR(\lambda,k)=P_{speech}(\lambda,k)/P_{noise}(\lambda,k)$$

A term $R(\lambda,k)$ may be defined by:

$$R(\lambda,k)=P_{signal}(\lambda,k)/P_{noise}(\lambda,k)$$

From the above, $R(\lambda,k)$ also is equal to:

$$R(\lambda,k)=(P_{speech}(\lambda,k)+P_{noise}(\lambda,k))/P_{noise}(\lambda,k)$$

Alternatively, $R(\lambda,k)$ also is equal to:

$$R(\lambda,k)=SNR(\lambda,k)+1$$

Accordingly, signal-to-noise ratio may be determined as follows:

$$SNR(\lambda,k)=P_{signal}(\lambda,k)/P_{noise}(\lambda,k)-1$$

In the above equation, the noisy signal power $P_{signal}(\lambda,k)$ may be computed based on:

$$P_{signal}(\lambda,k)=P_{speech}(\lambda,k)+P_{noise}(\lambda,k)$$

In addition, the noise power $P_{noise}(\lambda,k)$ may be computed using any of the methods described above.

In some embodiments, the noise reduction module 160 is configured to receive a plurality of microphone signals from a plurality of microphones, respectively; determine a signal-to-noise ratio for each of the plurality of microphone signals; determine a maximum of the plurality of signal-to-noise ratios; and select a microphone corresponding to the maximum of the plurality of signal-to-noise ratios. For example, in some hands-free applications, a plurality of microphones and a single loudspeaker are used in a communication system. The microphones may be used to create beam forming, and each individual beam may be passed through a corresponding AEC. If there are M beams, and M AECs, one for each beam, then for each frame index λ the the noise reduction module 160 may be configured to select the beam (e.g., the microphone) with the highest SNR. For example, for each frame index λ and for each beam m (m=0, 1, . . . , M-1), $TotalSNR_{beam(m)}(\lambda)$ may be determined as follows:

$$TotalSNR_{beam}(\lambda)=\Sigma_{k=K1}^{K2} SNRBeam\_m(\lambda,k)$$

In this equation, k is a frequency bin index, and for each beam m, the $SNRBeam\_m(\lambda, k)$ is computed as described above. The parameter K1 and K2 may be chosen based on a frequency range of interest.

In some embodiments, a beam selection algorithm includes letting m0 be a final current beam index. A beam index index_max with maximum beam may be determined as follows:

$$index\_max:max\{TotalSNR_{beam(m)}(\lambda)\}$$

If $TotalSNR_{beam(index\_max)}(\lambda)$ is greater than $(TotalSNR_{beam(m0)}(\lambda)+\rho)$, then beam index index_max may be changed and m0 may be set to the new beam index:

$$m0=index\_max.$$

In the above, ρ may be greater than 0 may be chosen in a range between 1 dB to 3 dB.

The signals described above are illustrative, and an AEC system may include a variety of additional signals beyond those depicted in FIG. 2 without departing from the inventive concepts described herein. For example, step-size determination module 150 may use additional or different microphone signals apart from those depicted in FIG. 2.

Processes for Frequency-Domain Echo Cancellation

Figure 3:
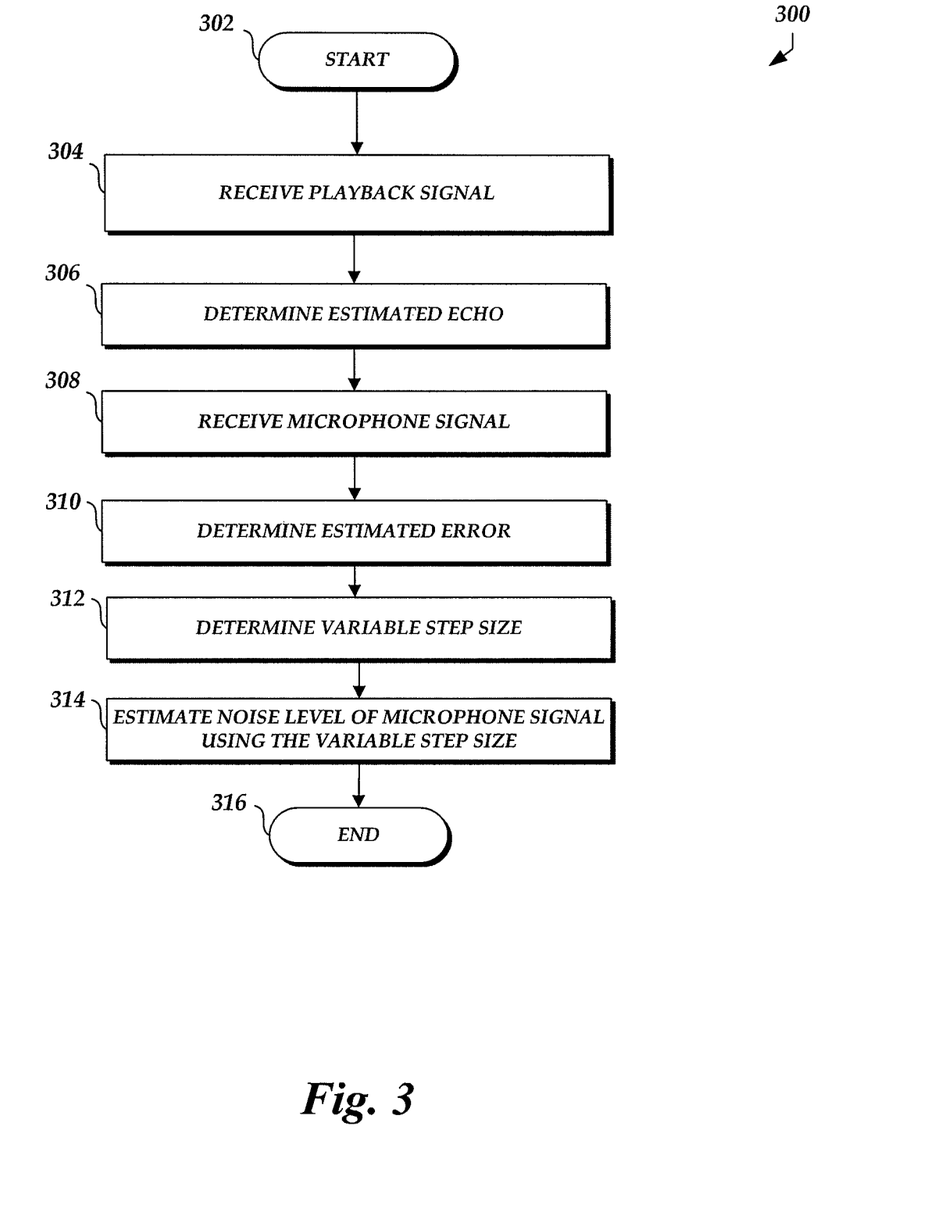
FIG. 3 is a flow diagram of an illustrative process for performing noise reduction using information from a step-size determination module in accordance with aspects of the present disclosure.

With reference now to FIG. 3, an example process 300 for performing noise reduction using information from a step-size determination module according to an embodiment will be described. The process 300 may be embodied in hardware, a set of executable program instructions, or a combination of hardware and executable program instructions. The process 300 may be performed, for example, by the AEC 140 and noise reduction module 160 of FIG. 2. Although the process 300 of FIG. 3 will be described with respect to the components of FIG. 2, the process 300 is not limited to implementation by, or in conjunction with, any specific component shown in FIG. 2. In some embodiments, the process 300, or some variant thereof, may be implemented by alternative components, by the components of FIG. 2 in a different configuration, etc.

The process 300 begins at block 302. At block 304, a playback signal is received. For example, AEC 140 receives a playback signal x.

At block 306, an estimated echo is determined. For example, AEC 140 may determine an estimated echo e using the playback signal x and a variable step size $\alpha_{vss}$. In particular, AEC 140 may apply an estimated transfer function $h_{est}$ to playback signal x, yielding estimated echo $h_{est}*x$. In addition, the coefficients of the estimated transfer function $h_{est}$ may depend on the variable step size $\alpha_{vss}$. The variable step size $\alpha_{vss}$ may depend on whether near-end speech is present in the microphone signal. For example, the variable step size $\alpha_{vss}$ generally comprises values between 0 and 1. If near-end speech is present (e.g., a doubletalk condition), $\alpha_{vss}$ tends to approach 0. If speech is absent, $\alpha_{vss}$ tends to approach 1.

At block 308, a microphone signal is received. For example, AEC 140 may receive a microphone signal m from a microphone 130.

At block 310, an estimated error is determined. For example, AEC 140 may determine an estimated error err using the estimated echo $h_{est}*x$ and the microphone signal m. In particular, in one embodiment, estimated error err may be calculated as:

$$err=m-h_{est}*x$$

At block 312, a variable step size may be determined and/or updated. For example, the AEC 140 or step-size determination module 150 may determine an updated variable step size $\alpha_{vss}$ using the estimated error err and the microphone signal m. For example, in some embodiments, an updated variable step size $\alpha_{vss}$ may be determined using the following equation:

$$\alpha_{vss}(\lambda,k)=(\sigma_X^2(\lambda,k)+\eta^*\sigma_M^2(\lambda,k))/(\sigma_X^2(\lambda,k)+\eta^*\sigma_M^2(\lambda,k)+\kappa^*\sigma_{ERR}^2(\lambda,k))$$

At block 314, a noise level of the microphone signal may be estimated using the variable step size $\alpha_{vss}$. For example, the noise reduction module 160 may estimate the noise level of the microphone signal m using the variable step size $\alpha_{vss}$. In particular, the noise reduction module 160 may estimate the noise level of the microphone signal m using the equation:

$$P(\lambda,k)=\tau(\lambda,k)^*P(\lambda-1,k)+(1-\tau(\lambda,k))^*|ERR(\lambda,k)|^2$$

In this equation, $\tau(\lambda,k)$ may be determined as follows:

$$\tau(\lambda,k)=1-(1-\alpha)^*\alpha_{vss}(\lambda,k)$$

At block 316, the process 300 ends. The process 300 may be executed in a continuous or substantially continuous loop as additional frames are processed and the adaptive filters are updated.

Figure 4:
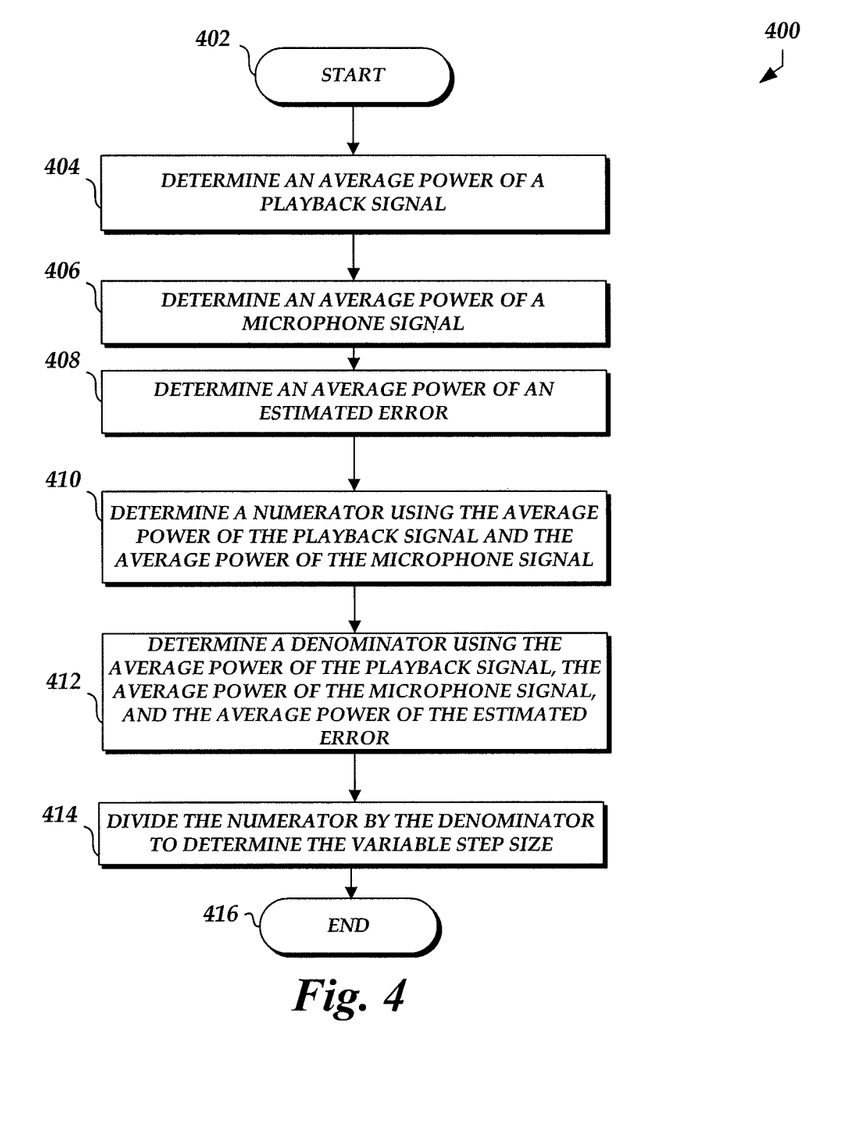
FIG. 4 is a flow diagram of an illustrative process for determining a variable step size in accordance with aspects of the present disclosure.

Turning now to FIG. 4, an example process 400 for determining a variable step size according to an embodiment will be described. The process 400 may be embodied in hardware, a set of executable program instructions, or a combination of hardware and executable program instructions. The process 400 may be performed, for example, by the AEC 140 and/or step-size determination module 150 of FIG. 2. Although the process 400 of FIG. 4 will be described with respect to the components of FIG. 2, the process 400 is not limited to implementation by, or in conjunction with, any specific component shown in FIG. 2. In some embodiments, the process 400, or some variant thereof, may be implemented by alternative components, by the components of FIG. 2 in a different configuration, etc.

The process 400 begins at block 402. At block 404, an average power of the playback signal is determined. For example, step-size determination module 150 may determine an average power, or variance, $\sigma_x^2$ of the playback signal x for a given frame $\lambda$ and for each sample index n as follows:

$$\sigma_x^2(\lambda,n)=\beta_x^*\sigma_x^2(\lambda-1,n)+(1-\beta_x)^*x(n)^2$$

Alternatively, step-size determination module 150 may determine an average power, or variance, $\sigma_x^2$ of the playback signal X for a given frame $\lambda$ and frequency bin index k as follows:

$$\sigma_X^2(\lambda,k)=\beta_x^*\sigma_X^2(\lambda-1,k)+(1-\beta_x)^*|X(\lambda,k)|^2$$

At block 406, an average power of a microphone signal is determined. For example, step-size determination module 150 may determine an average power, or variance, $\sigma_m^2$ of the microphone microphone signal m for a given frame $\lambda$ and for each sample index n as follows:

$$\sigma_m^2(\lambda,n)=\beta_m^*\sigma_m^2(\lambda-1,n)+(1-\beta_m)^*m(n)^2$$

Alternatively, step-size determination module 150 may determine an average power, or variance, $\sigma_M^2$ of the microphone signal M for a given frame $\lambda$ and frequency bin index k as follows:

$$\sigma_M^2(\lambda,k)=\beta_m^*\sigma_M^2(\lambda-1,k)+(1-\beta_m)^*|M(\lambda,k)|^2$$

At block 408, an average power of an estimated error is determined. For example, step-size determination module 150 may determine an average power, or variance, $\sigma_{err}^2$ of the AEC output err for a given frame $\lambda$ and for each sample index n as follows:

$$\sigma_{err}^2(\lambda,n)=\beta_e^*\sigma_{err}^2(\lambda-1,n)+(1-\beta_e)^*err(n)^2$$

Alternatively, step-size determination module 150 may determine an average power, or variance, $\sigma_{ERR}^2$ of the AEC output ERR for a given frame $\lambda$ and frequency bin index k as follows:

$$\sigma_{ERR}^2(\lambda,k)=\beta_e^*\sigma_{ERR}^2(\lambda-1,k)+(1-\beta_e)^*|ERR(k)|^2$$

At block 410, a numerator using the average power of the playback signal and the average power of the microphone signal may be determined. At block 412, a denominator using the average power of the playback signal, the average power of the microphone signal, and the average power of the estimated error may be determined. At block 414, the numerator may be divided by the denominator to determine the variable step size. For example, the step-size determination module 150 may determine a numerator using the average power of the playback signal and the average power of the microphone signal; determine a denominator using the average power of the playback signal, the average power of the microphone signal, and the average power of the estimated error; and divide the numerator by the denominator to determine the variable step size using the following equation:

$$\alpha_{vss}(\lambda,n)=(\sigma_x^2(\lambda,n)+\eta^*\sigma_m^2(\lambda,n))/(\sigma_x^2(\lambda,n)+\eta^*\sigma_m^2(\lambda,n)+\sigma_{err}^2(\lambda,n))$$

Alternatively, the step-size determination module 150 may determine a numerator using the average power of the playback signal and the average power of the microphone signal; determine a denominator using the average power of the playback signal, the average power of the microphone signal, and the average power of the estimated error; and divide the numerator by the denominator to determine the variable step size using the following equation:

$$\alpha_{vss}(\lambda,k)=(\alpha_X^2(\lambda,k)+\eta^*\sigma_M^2(\lambda,k))/(\sigma_X^2(\lambda,k)+\eta^*\sigma_M^2(\lambda,k)+\kappa^*\sigma_{ERR}^2(\lambda,k))$$

At block 416, the process 400 ends. The process 400 may be executed in a continuous or substantially continuous loop as additional frames are processed and the adaptive filters are updated.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, M and Z," unless specifically stated otherwise, is to be understood with the context as used in general to convey that an item, term, etc. may be either X, M or Z, or a combination thereof. Thus, such conjunctive language is not generally intended to imply that certain embodiments require at least one of X, at least one of M and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    a speaker configured to produce sound using an audio playback signal;
    a microphone configured to detect the produced sound as a microphone signal;
    one or more processors in communication with the speaker and the microphone, the one or more processors configured to:
        determine an estimated echo using the audio playback signal and a variable step size, the variable step size depending on whether near-end speech is present in the microphone signal;
        determine an estimated error using the estimated echo and the microphone signal;
        update the variable step size using the estimated error and the microphone signal;
        estimate a noise level of the microphone signal using the updated variable step size;
        perform noise reduction on the microphone signal using the estimate of the noise level, wherein the variable step size is determined using an average power of the audio playback signal, an average power of the microphone signal, and an average power of the estimated error, and wherein determining the variable step size comprises:
            determining a numerator using the average power of the audio playback signal and the average power of the microphone signal;
            determining a denominator using the average power of the audio playback signal, the average power of the microphone signal, and the average power of the estimated error; and
            dividing the numerator by the denominator to determine the variable step size.

2. The system of claim 1, wherein the one or more processors are further configured to determine the variable step size using a cross correlation between the microphone signal and the estimated error.

3. The system of claim 1, wherein estimating the noise level of the microphone signal comprises:
    determining a plurality of values of a power spectrum of the estimated error;
    determining a minimum value of the plurality of values of the power spectrum of the estimated error; and
    determining the estimate of the noise level using the minimum value of the power spectrum.

4. The system of claim 3, wherein the one or more processors are further configured to determine a signal-to-noise ratio using the estimated error and the estimate of the noise level.

5. The system of claim 4, wherein the one or more processors are further configured to:
    receive a plurality of microphone signals from a plurality of microphones, respectively;
    determine a signal-to-noise ratio for each of the plurality of microphone signals;
    determine a maximum of the plurality of signal-to-noise ratios; and
    select a microphone corresponding to the maximum of the plurality of signal-to-noise ratios.

6. A method comprising:
    receiving a playback signal;
    determining an estimated echo using the playback signal;
    receiving a microphone signal;
    determining an estimated error using the estimated echo and the microphone signal;
    determining a variable step size using the estimated error, the microphone signal, an average power of the playback signal, an average rower of the microphone signal, and an average power of the estimated error, wherein determining the variable step size comprises:
        determining a numerator using the average power of the playback signal and the average power of the microphone signal;
        determining a denominator using the average power of the playback signal, the average power of the microphone signal, and the average power of the estimated error; and dividing the numerator by the denominator to determine the variable step size; and estimating a noise level of the microphone signal using the variable step size.

7. The method of claim 6, further comprising determining the variable step size using a cross correlation between the microphone signal and the estimated error.

8. The method of claim 6, wherein estimating the noise level of the microphone signal comprises:

determining a plurality of values of a power spectrum of the estimated error;

determining a minimum value of the plurality of values of the power spectrum of the estimated error; and determining the estimate of the noise level using the minimum value of the power spectrum.

9. The method of claim 8, further comprising determining a signal-to-noise ratio using the estimated error and the estimate of the noise level.

10. The method of claim 9, further comprising:

receiving a plurality of microphone signals;

determining a signal-to-noise ratio for each of the plurality of microphone signals; and determining a maximum of the plurality of signal-to-noise ratios.

11. One or more non-transitory computer-readable storage media comprising computer-executable instructions to:

receive a playback signal;

determine an estimated echo using the playback signal;

receive a microphone signal;

determine an estimated error using the estimated echo and the microphone signal;

determine a variable step size using the estimated error, the microphone signal, an average power of the playback signal, an average power of the microphone signal, and an average power of the estimated error, wherein determining the variable step size comprises:

determining a numerator using the average power of the playback signal and the average power of the microphone signal;

determining a denominator using the average power of the playback signal, the average power of the microphone signal, and the average power of the estimated error; and dividing the numerator by the denominator to determine the variable step size; and estimate a noise level of the microphone signal using the variable step size.

12. The one or more non-transitory computer-readable storage media of claim 11, further comprising computer-executable instructions to determine the variable step size using a cross correlation between the microphone signal and the estimated error.

13. The one or more non-transitory computer-readable storage media of claim 11, wherein estimating the noise level of the microphone signal comprises:

determining a plurality of values of a power spectrum of the estimated error;

determining a minimum value of the plurality of values of the power spectrum of the estimated error; and determining the estimate of the noise level using the minimum value of the power spectrum.

14. The one or more non-transitory computer-readable storage media of claim 13, further comprising computer-executable instructions to determine a signal-to-noise ratio using the estimated error and the estimate of the noise level.

* * * * *